(12) United States Patent
Mao et al.

(10) Patent No.: US 9,473,031 B2
(45) Date of Patent: Oct. 18, 2016

(54) VARIABLE FEEDBACK SIGNAL BASED ON CONDUCTION TIME

(71) Applicant: Power Integrations, Inc., San Jose, CA (US)

(72) Inventors: Mingming Mao, Saratoga, CA (US); Ricardo Luis Janezic Pregitzer, Palo Alto, CA (US); Tiziano Pastore, Los Gatos, CA (US); Peter Vaughan, Los Gatos, CA (US)

(73) Assignee: Power Integrations, Inc., San Jose, CA (US)

( * ) Notice: Subject to any disclaimer, the term of this patent is extended or adjusted under 35 U.S.C. 154(b) by 266 days.

(21) Appl. No.: 14/153,967

(22) Filed: Jan. 13, 2014

(65) Prior Publication Data

US 2015/0200599 A1    Jul. 16, 2015

(51) Int. Cl.
*H02M 3/335* (2006.01)
*H02M 5/257* (2006.01)
*H05B 33/08* (2006.01)
*H02M 1/00* (2006.01)

(52) U.S. Cl.
CPC ..... *H02M 3/33507* (2013.01); *H02M 3/33515* (2013.01); *H02M 3/33523* (2013.01); *H02M 5/257* (2013.01); *H02M 2001/007* (2013.01); *H02M 2001/0025* (2013.01); *H05B 33/0815* (2013.01)

(58) Field of Classification Search
CPC ............... H02M 2001/0025; H02M 3/33507; H02M 3/33515; H02M 3/33523
USPC ................................................. 315/307, 308
See application file for complete search history.

(56) References Cited

U.S. PATENT DOCUMENTS

| 8,102,683 B2 | 1/2012 | Gaknoki et al. | |
| 8,462,523 B2 | 6/2013 | Gaknoki et al. | |
| 2011/0194311 A1* | 8/2011 | Gaknoki | H02M 7/217 363/21.12 |
| 2013/0241440 A1 | 9/2013 | Gaknoki et al. | |
| 2013/0314002 A1* | 11/2013 | Khayat | H05B 37/0227 315/307 |
| 2014/0239840 A1 | 8/2014 | Wang et al. | |

* cited by examiner

*Primary Examiner* — Fred E Finch, III
*Assistant Examiner* — Rafael O De Leon Domenech
(74) *Attorney, Agent, or Firm* — Blakely Sokoloff Taylor & Zafman LLP

(57) ABSTRACT

A controller for a power converter includes conduction detection circuitry and a variable reference generator. The conduction detection circuitry is coupled to generate a conduction signal representative of conduction times that an input signal is above a threshold value. The variable reference generator is coupled to receive the conduction signal and configured to generate a count value in response to a first conduction time of the conduction signal. The variable reference generator is coupled to output a reference signal in response to the count value and in response to prior count values stored in the variable reference generator.

23 Claims, 9 Drawing Sheets

VARIABLE FEEDBACK SIGNAL BASED ON CONDUCTION TIME

BACKGROUND INFORMATION

1. Field of the Disclosure

The present invention relates generally to power converters, and more specifically to power converters utilized with dimmer circuits.

2. Background

Electronic devices use power to operate. Switched mode power converters are commonly used due to their high efficiency, small size and low weight to power many of today's electronics. Conventional wall sockets provide a high voltage alternating current. In a switching power converter, a high voltage alternating current (ac) input is converted to provide a well regulated direct current (dc) output through an energy transfer element. The switched mode power converter control circuit usually provides output regulation by sensing one or more inputs representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

In one type of dimming for lighting applications, a triac dimmer circuit typically disconnects the ac input voltage to limit the amount of voltage and current supplied to an incandescent lamp. This is known as phase dimming because it is often convenient to designate the position of the triac dimmer circuit and the resultant amount of missing voltage in terms of a fraction of the period of the ac input voltage measured in degrees. In general, the ac input voltage is a sinusoidal waveform and the period of the ac input voltage is referred to as a full line cycle. As such, half the period of the ac input voltage is referred to as a half line cycle. An entire period has 360 degrees, and a half line cycle has 180 degrees. Typically, the phase angle is a measure of how many degrees (from a reference of zero degrees) of each half line cycle the triac dimmer circuit disconnects the ac input. As such, removal of half the ac input voltage in a half line cycle by the triac dimmer circuit corresponds to a phase angle of 90 degrees. In another example, removal of a quarter of the ac input voltage in a half line cycle may correspond to a phase angle of 45 degrees.

On the other hand, the conduction angle is a measure of how many degrees (from a reference of zero degrees) of each half line cycle that the triac dimmer circuit does not disconnect the ac input voltage from the power converter. Or in other words, the conduction angle is a measure of how many degrees of each half line cycle in which the triac dimmer circuit is conducting. In one example, the removal of a quarter of the ac input voltage in a half line cycle may correspond to a phase angle of 45 degrees but a conduction angle of 135 degrees.

Although phase angle dimming works well with incandescent lamps that receive the altered ac input voltage directly, it typically creates problems for light emitting diode (LED) lamps. Most LEDs and LED modules are best driven by a regulated current which a regulated power converter can provide from an ac power line. Triac dimmer circuits typically don't work well with conventional regulated power converter controllers. Regulated power supplies are typically designed to ignore distortions of the ac input voltage. Their purpose is to deliver a constant regulated output until a low input RMS voltage causes them to shut off completely. As such, conventional regulated power supplies would not dim the LED lamp. Unless a power converter for an LED lamp is specially designed to recognize and respond to the voltage from a triac dimmer circuit in a desirable way, a triac dimmer is likely to produce unacceptable results such as flickering or shimmering of the LED lamp with large conduction angles and flashing of the LED lamp at low conduction angles.

Thus, a power converter may include an improved conventional power converter controller that is designed to respond to a triac dimmer circuit by directly sensing the average value of the dimmer circuit output (in other words, the average value of the ac input voltage after the triac dimmer circuit has processed the ac input voltage) to determine the amount of dimming requested. In general, a smaller average value of the dimmer circuit output would correspond to a removal of a greater portion of the ac input voltage and thus a larger phase angle. As such, the improved conventional power converter controller utilizes this relationship to indirectly determine the phase angle and alter the quantity to which the output of the power converter is regulated. However, by indirectly measuring the phase angle in this manner, the amount of dimming detected (and hence the quantity to which the output of the power converter is regulated) is subject to variances of the ac input voltage. In other words, the accuracy of the phase angle measured through the average value of the dimmer circuit output is dependent on variances of the ac input voltage.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
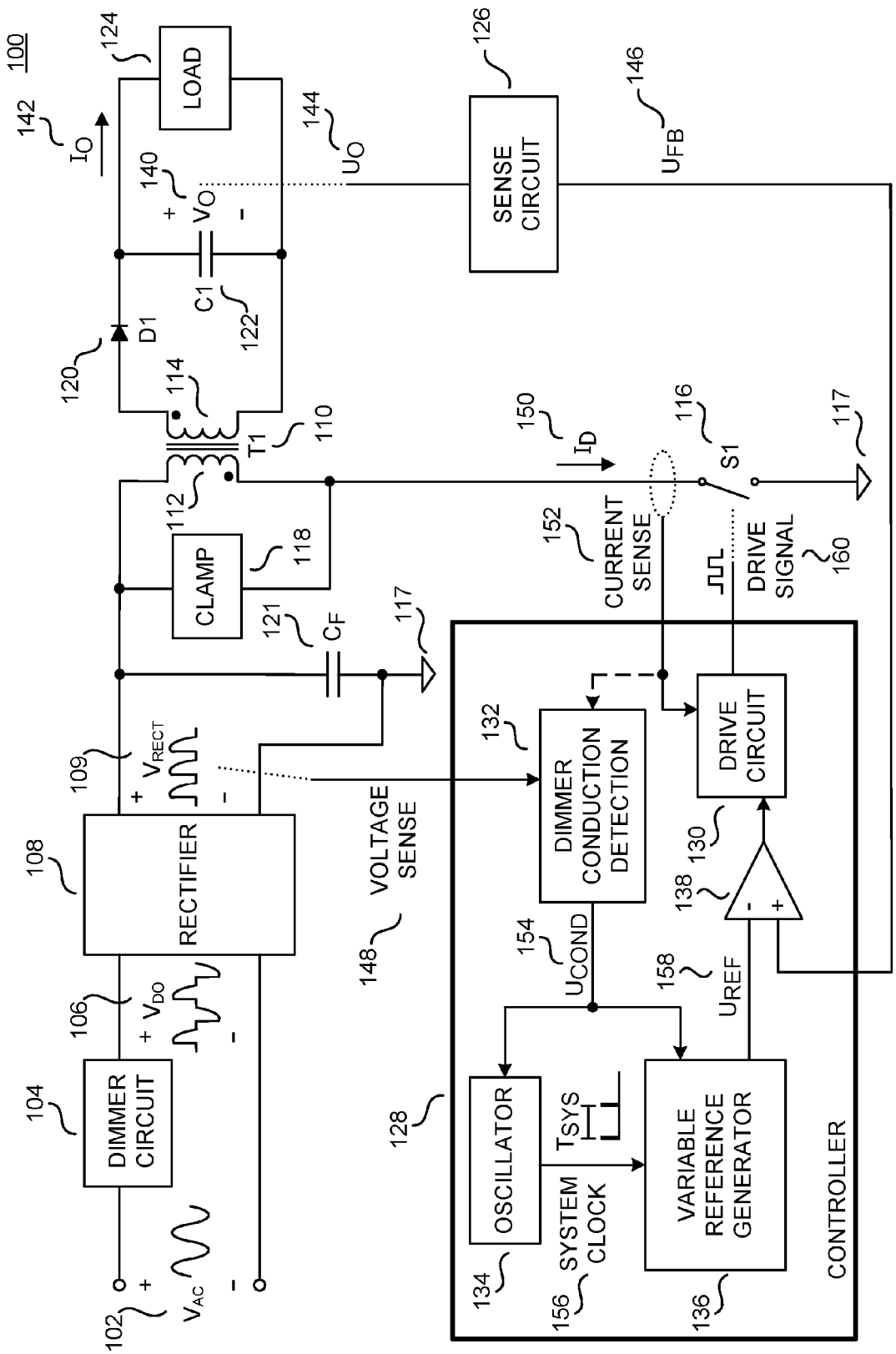
FIG. 1 is a functional block diagram illustrating an example power converter with a dimmer circuit utilizing a controller, in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

For phase dimming applications, including those for light emitting diodes (LEDs), a phase dimmer circuit typically disconnects the ac input voltage for a portion of every half line cycle to limit the amount of voltage and current supplied to the LEDs. As mentioned above, typically, the phase angle is a measure of how many degrees of each half line cycle the dimmer circuit has disconnected the input. For example, the half line cycle of the ac input voltage may have a total of 180 degrees. As such, removal of half the ac input voltage in a half line cycle by the dimmer circuit corresponds to a phase angle of 90 degrees. In another example, removal of a quarter of the ac input voltage in a half line cycle may correspond to a phase angle of 45 degrees.

Alternatively, the conduction angle is a measure of how many degrees (from a reference of zero degrees) of each half line cycle that the triac dimmer circuit does not disconnect the ac input voltage. Or in other words, the conduction angle is a measure of how many degrees of each half line cycle in which the triac dimmer circuit is conducting. In one example, the removal of a quarter of the ac input voltage in a half line cycle may correspond to a phase angle of 45 degrees but a conduction angle of 135 degrees. As such, the amount of dimming set by the dimmer circuit may be determined by measuring the amount of time which the ac input voltage is disconnected (i.e., the amount of time which the dimmer circuit is not conducting) or the amount of time which the ac input voltage is not disconnected (i.e. the amount of time which the dimmer circuit is conducting).

In one example of the present invention, the amount of dimming set by the dimmer circuit is directly measured from the ac input voltage. In one example, a conduction signal may be generated from the ac input voltage and is representative of the position of the dimmer circuit. For example, the conduction signal may be a rectangular pulse waveform with varying lengths of logic high and logic low sections. The conduction signal may be logic high when the dimmer circuit conducts (or in other words when the ac input voltage is not disconnected from the power converter) and logic low when the dimmer circuit does not conduct (or in other words when the ac input voltage is disconnected from the power converter) or vice versa. The length of the logic high or logic low sections may correspond to the amount of time which the dimmer circuit is conducting or is not conducting. As such, the conduction angle or the phase angle can be directly measured from the ac input voltage. Further, examples of the present invention include a variable reference generator which generates a variable feedback reference in response to the dimmer circuit. The variable reference generator is coupled to generate a reference value in response to the conduction of the dimmer circuit over several full line cycles of the input signal. In one example, the variable reference generator generates central tendency value of the conduction time of the dimmer circuit over several full line cycles of the input signal. The variable feedback reference is then updated to substantially equal the central tendency value when certain conditions are met. Referring first to FIG. 1, a functional block diagram of an example power converter 100 is illustrated including ac input voltage $V_{AC}$ 102, a dimmer circuit 104, a dimmer output voltage $V_{DO}$ 106, a rectifier 108, a rectified voltage $V_{RECT}$ 109, an energy transfer element T1 110, a primary winding 112 of the energy transfer element T1 110, a secondary winding 114 of the energy transfer element T1 110, a switch S1 116, input return 117, a clamp circuit 118, a rectifier D1 120, an input capacitor $C_F$ 121, an output capacitor C1 122, a load 124, a sense circuit 126, and a controller 128. Controller 128 further includes a drive circuit block 130, a dimmer conduction detection circuit 132, an oscillator 134, a variable reference generator 136, and a feedback reference circuit 138 (shown as a comparator or operational amplifier). In one example, sense circuit 126 may also be included in controller 128. FIG. 1 further illustrates an output voltage $V_O$ 140, an output current $I_O$ 142, an output quantity $U_O$ 144, a feedback signal $U_{FB}$ 146, a voltage sense signal 148, a switch current $I_D$ 150, a current sense signal 152, a conduction signal $U_{COND}$ 154, a system clock 156, a feedback reference signal $U_{REF}$ 158 and a drive signal 160. The example switched mode power converter 100 illustrated in FIG. 1 is coupled in a flyback configuration, which is just one example of a switched mode power converter that may benefit from the teachings of the present invention. It is appreciated that other known topologies and configurations of switched mode power converters may also benefit from the teachings of the present invention. In addition, the example power converter shown in FIG. 1 is an isolated power converter. It should be appreciated that non-isolated power converters may also benefit from the teachings of the present invention.

The power converter 100 provides output power to the load 124 from an unregulated input voltage. In one embodiment, the input voltage is the ac input voltage $V_{AC}$ 102. In another embodiment, the input voltage is a rectified ac input voltage such as rectified voltage $V_{RECT}$ 109. As shown, dimmer circuit 104 receives the ac input voltage $V_{AC}$ 102 and produces the dimmer output voltage $V_{DO}$ 106. The dimmer circuit 104 may be utilized to limit the voltage delivered to the power converter 100. In one embodiment, the dimmer circuit 104 may be a phase dimming circuit such as a triac phase dimmer. The dimmer circuit 104 further couples to the rectifier 108 and the dimmer output voltage $V_{DO}$ 106 is received by the rectifier 108.

The rectifier 108 outputs rectified voltage $V_{RECT}$ 109. In one embodiment, rectifier 108 may be a bridge rectifier. The rectifier 108 further couples to the energy transfer element T1 110. In some embodiments of the present invention, the energy transfer element T1 110 may be a coupled inductor. In other embodiments, the energy transfer element T1 110 may be a transformer. In a further example, the energy transfer element 110 may be an inductor. In the example of FIG. 1, the energy transfer element T1 110 includes two windings, a primary winding 112 and a secondary winding 114. However, it should be appreciated that the energy transfer element T1 110 may have more than two windings. In the example of FIG. 1, primary winding 112 may be considered an input winding, and secondary winding 114 may be considered an output winding. The primary winding 112 is further coupled to switch S1 116, which is then further coupled to input return 117.

In addition, the clamp circuit 118 is illustrated in the example of FIG. 1 as being coupled across the primary winding 112 of the energy transfer element T1 110. The filter capacitor $C_F$ 121 may couple across the primary winding 112 and switch S1 116. In other words, the filter capacitor $C_F$ 121 may couple to the rectifier 108 and input return 117. Secondary winding 114 of the energy transfer element T1 110 is coupled to the rectifier D1 120. In the example of FIG. 1, the rectifier D1 120 is exemplified as a diode. However, in some embodiments the rectifier D1 120 may be a transistor used as a synchronous rectifier. Both the output capacitor C1 122 and the load 124 are shown in FIG. 1 as being coupled to the rectifier D1 120. An output is provided to the load 124 and may be provided as either a regulated output voltage $V_O$ 140, regulated output current $I_O$ 142, or a combination of the two. In one embodiment, the load 124 may be a light emitting diode (LED), an LED module or an LED array.

The power converter 100 further comprises circuitry to regulate the output which is exemplified as output quantity $U_O$ 144. In general, the output quantity $U_O$ 144 is either an output voltage $V_O$ 140, an output current $I_O$ 142, or a combination of the two. A sense circuit 126 is coupled to sense the output quantity $U_O$ 144 and to provide feedback signal $U_{FB}$ 146, which is representative of the output quantity $U_O$ 144. Feedback signal $U_{FB}$ 146 may be a voltage signal or a current signal. In one example, the sense circuit 126 may sense the output quantity $U_O$ 144 from an additional winding included in the energy transfer element T1 110. In another example, there may be a galvanic isolation (not shown) between the controller 128 and the sense circuit 126. The galvanic isolation could be implemented by using devices such as an opto-coupler, a capacitor or a magnetic coupling. In a further example, the sense circuit 126 may utilize a voltage divider to sense the output quantity UO 144 from the output of the power converter 100.

Controller 128 is coupled to the sense circuit 126 and receives the feedback signal $U_{FB}$ 146 from the sense circuit 126. The controller 128 further includes terminals for receiving the voltage sense signal 148, current sense signal 152 and for providing the drive signal 160 to power switch S1 116. In the example of FIG. 1, the voltage sense signal 148 may be representative of the rectified voltage $V_{RECT}$ 109. However, in other examples the voltage sense signal 148 may be representative of the dimmer output voltage $V_{DO}$ 106. The voltage sense signal 148 may be a voltage signal or a current signal. The current sense signal 152 may be representative of the switch current $I_D$ 150 in the power switch S1 116. Current sense signal 152 may be a voltage signal or a current signal. In addition, the controller 128 provides drive signal 160 to the power switch S1 116 to control various switching parameters to control the transfer of energy from the input of power converter 100 to the output of power converter 100. Examples of such parameters may include switching frequency, switching period, duty cycle, or respective ON and OFF times of the power switch S1 116.

As illustrated in the example of FIG. 1, the controller 128 includes the drive circuit 130, dimmer conduction detection circuit 132, variable reference generator 136, and feedback reference circuit 138. Drive circuit 130 is coupled to control switching of switch 116 (via drive signal 160) in response to feedback reference signal $U_{REF}$ 158. In addition, the drive circuit 130 may also be coupled to be responsive to the current sense signal 152. Although a single controller is illustrated in FIG. 1, it should be appreciated that multiple controllers may be utilized by the power converter 100. In addition, the drive circuit 130, dimmer conduction detection circuit 132, variable reference generator 136, and feedback reference circuit 138 need not be within a single controller. For example, the power converter 100 may have a primary controller coupled to the input side of the power converter 100 and a secondary controller coupled to the output side of the power converter 100. The dimmer conduction detection circuit 132, variable reference generator 136, and feedback reference circuit 138 may be included in the secondary controller and the drive circuit 130 may be included in the primary controller. The output of the feedback reference circuit 138 may be sent to the drive circuit 130 through a communication link, such as a magnetic coupling.

Dimmer conduction detection circuit 132 is coupled to generate a conduction signal which is representative of conduction times of the dimmer circuit 104. In one example, the dimmer conduction detection circuit 132 may be coupled to generate the conduction signal which is representative of the conduction times that an input signal (e.g. $V_{RECT}$ 109) is above a threshold value (e.g. zero Volts). In the illustrated example, dimmer conduction detection circuit 132 is coupled to receive the voltage sense signal 148 from $V_{RECT}$ 109 and output the conduction signal $U_{COND}$ 154. The dimmer conduction detection circuit 132 may also alternatively receive the current sense signal 152. In one example, a conduction signal $U_{COND}$ 154 may be generated from the voltage sense signal 148 (or alternatively the current sense signal 152, or both) and is representative of the amount of dimming set by the dimmer circuit 104.

As shown in FIG. 1, the feedback reference circuit 138 may be coupled to receive the feedback reference signal $U_{REF}$ 158 and the feedback signal $U_{FB}$ 146. The output of the feedback reference circuit 138 is received by the drive circuit 130. In one example, the feedback reference circuit 128 may be an amplifier, a transconductance amplifier, or a comparator.

In operation, the power converter 100 of FIG. 1 provides output power to the load 124 from an unregulated input such as the ac input voltage $V_{AC}$ 102. The dimmer circuit 104 may be utilized to limit the amount of voltage delivered to the power converter. For the example of an LED load, when the dimmer circuit 104 limits the amount of power delivered to the power converter, the resultant current delivered to the load of LED arrays by the controller 128 is also limited and the LED array dims. As mentioned above, the dimmer circuit 104 may be a phase dimming circuit such as a triac dimmer circuit or a Metal-Oxide-Semiconductor Field Effect Transistor ("MOSFET") dimmer circuit. For leading edge dimming, the dimmer circuit 104 disconnects the ac input voltage $V_{AC}$ 102 when the ac input voltage $V_{AC}$ 102 crosses zero voltage. After a given amount of time, the dimmer circuit 104 reconnects the ac input voltage $V_{AC}$ 102 with the power converter 100. The amount of time before the dimmer circuit reconnects the ac input voltage $V_{AC}$ 102 is set by a user. For trailing edge dimming, the dimmer circuit 104 connects the input to the power converter when the ac input voltage $V_{AC}$ 102 crosses zero voltage. After a given amount of time set by a user, the dimmer circuit 104 then disconnects the ac input voltage $V_{AC}$ 102 for the remainder of the half cycle. In other words, the dimmer circuit 104 may interrupt the phase of the ac input voltage $V_{AC}$ 102. Depending on the desired amount of dimming, the dimmer circuit 104 controls the amount of time the ac input voltage $V_{AC}$ 102 is disconnected from the power converter 100. In general, the more dimming wanted corresponds to a longer period of time during which the dimming circuit 104 disconnects the ac input voltage $V_{AC}$ 102. As will be further discussed, the phase angle may be determined by measuring the period of time during which the dimming circuit 104 disconnects the ac input voltage $V_{AC}$ 102. On the other hand, the conduction angle may be determined by measuring the period of time which the dimmer circuit 104 does not disconnect the ac input voltage $V_{AC}$ 102.

The dimmer circuit 104 produces the dimmer output voltage $V_{DO}$ 106 which is received by rectifier 108. The rectifier 108 produces the rectified voltage $V_{RECT}$ 109. The filter capacitor $C_F$ 121 filters the high frequency current from the switch S1 116. For other applications, the filter capacitor $C_F$ 121 may be large enough such that a substantially dc voltage is applied to the energy transfer element T1 110. However, for power supplies with power factor correction (PFC), a small filter capacitor $C_F$ 121 may be utilized to allow the voltage applied to the energy transfer element T1 110 to substantially follow the rectified voltage $V_{RECT}$ 109. As such, the value of the filter capacitor $C_F$ 121 may be chosen such that the voltage on the filter capacitor $C_F$ 121 reaches substantially zero during each half-line cycle of the ac input voltage $V_{AC}$ 102. Or in other words, the voltage on the filter capacitor $C_F$ 121 substantially follows the positive magnitude of the dimmer output voltage $V_{DO}$ 106. As such, the controller 128 may detect when the dimmer circuit 104 disconnects and reconnects the ac input voltage $V_{AC}$ 102 from the power converter 100 by sensing the voltage on the filter capacitor $C_F$ 121 (or in other words the rectified voltage $V_{RECT}$ 109). In another example, the controller 128 may detect when the dimmer circuit 104 disconnects and reconnects the ac input voltage $V_{AC}$ 102 from the power converter 100 by sensing the switch current $I_D$ 150. In a further example, the controller 128 may detect that the dimmer circuit 104 disconnects and reconnects the ac input voltage $V_{AC}$ 102 from the power converter 100 by sensing the input current (in one example, the current flowing between the rectifier 108 and filter capacitor $C_F$ 121).

The switching power converter 100 utilizes the energy transfer element T1 110 to transfer voltage between the primary 112 and the secondary 114 windings. The clamp circuit 118 is coupled to the primary winding 112 to limit the maximum voltage on the switch S1 116. Switch S1 116 is opened and closed in response to the drive signal 160. It is generally understood that a switch that is closed may conduct current and is considered on, while a switch that is open cannot conduct current and is considered off. In one example, the switch S1 116 may be a transistor such as a metal-oxide-semiconductor field-effect transistor (MOSFET). In another example, controller 128 may be implemented as a monolithic integrated circuit or may be implemented with discrete electrical components or a combination of discrete and integrated components. Controller 128 and switch S1 116 could form part of an integrated circuit that is manufactured as either a hybrid or monolithic integrated circuit. In operation, the switching of the switch S1 116 produces a pulsating current at the rectifier D1 120. The current in the rectifier D1 120 is filtered by the output capacitor C1 122 to produce a substantially constant output voltage $V_O$ 140, output current $I_O$ 142, or a combination of the two at the load 124.

The sense circuit 126 senses the output quantity $U_O$ 144 of the power converter 100 to provide the feedback signal $U_{FB}$ 146 to the controller 128. The feedback signal $U_{FB}$ 146 may be a voltage signal or a current signal and provides information regarding the output quantity $U_O$ 144 to the controller 128. In addition, the controller 128 receives the current sense input signal 152 which relays the switch current $I_D$ 150 in the switch S1 116. The switch current $I_D$ 150 may be sensed in a variety of ways, such as for example the voltage across a discrete resistor or the voltage across a transistor when the transistor is conducting. In addition, the controller 128 may receive the voltage sense input signal 148 which relays the value of the rectified voltage $V_{RECT}$ 109. The rectified voltage $V_{RECT}$ 109 may be sensed a variety of ways, such as for example through a resistor divider.

In one example, the controller 128 may determine the phase angle or conduction angle by utilizing the rectified voltage $V_{RECT}$ 109 provided by the voltage sense signal 148 or through the switch current $I_D$ 150 provided by the current sense input signal 152, or a combination of the two. For example, the controller 128 may measure the length of time which the dimmer circuit connects or disconnects the ac input voltage $V_{AC}$ 102 from the power converter. For determining the phase angle, the controller measures the length of time which the ac input voltage $V_{AC}$ 102 is substantially equal to zero. For determining the conduction angle, the controller measures the length of time which the ac input voltage $V_{AC}$ 102 is not substantially equal to zero. The length of time may be divided by the length of time of the half line cycle or the full line cycle to determine the phase or conduction angle.

Dimmer conduction detection circuit 132 is coupled to output the conduction signal $U_{COND}$ 154 in response to the voltage sense signal 148, current sense signal 152, or both. The conduction signal $U_{COND}$ 154 may be representative of the amount of dimming set by the dimmer circuit 104. The conduction signal $U_{COND}$ 154 may be a rectangular pulse waveform with varying lengths of logic high and logic low sections. The conduction signal $U_{COND}$ 154 may be logic high when the dimmer circuit 104 conducts (or in other words when the ac input voltage is not disconnected from the power converter) and logic low when the dimmer circuit does not conduct (or in other words when the ac input voltage is disconnected from the power converter) or vice versa. The length of the logic high or logic low sections may correspond to the amount of time which the dimmer circuit 104 is conducting or is not conducting.

The oscillator 134 is coupled to receive the conduction signal $U_{COND}$ 154. As will be further discussed, oscillator 134 generates the system clock 156 in response to the conduction signal 154. In one example, the oscillator 134 determines the frequency (or period) of the ac input voltage $V_{AC}$ 102 from the conduction signal $U_{COND}$ 154. The oscillator 134 then sets the frequency (or period) of the system clock 156 such that the system clock 156 pulses a fixed number of times in one period of the ac input voltage $V_{AC}$ 102. In one example, the frequency of the system clock 156 is $2^{12}$ times greater than the frequency of the ac input voltage $V_{AC}$ 102. Or in other words, the period of the ac input voltage $V_{AC}$ 102 (also referred to as a full line cycle $T_{FL}$) is $2^{12}$ times greater than the period $T_{SYS}$ of the system clock 156.

Variable reference generator 136 is also coupled to receive the system clock 156 and the conduction signal $U_{COND}$ 154 and outputs the feedback reference signal $U_{REF}$ 158 to the feedback reference circuit 138. As will be further discussed, the variable reference generator 136 averages the conduction signal $U_{COND}$ 154 over multiple half line cycles of the ac input voltage $V_{AC}$ 102, in some examples. In one example, the variable reference generator 136 averages the conduction signal $U_{COND}$ 154 over at least one full line cycle or two half line cycles. In other words, in one example the variable reference generator 136 averages the conduction signal $U_{COND}$ 154 over an even number of half line cycles. The variable reference generator 136 may also determine whether to update the feedback reference signal $U_{REF}$ 158 to substantially equal the averaged conduction signal $U_{COND}$ 154.

Figure 2:
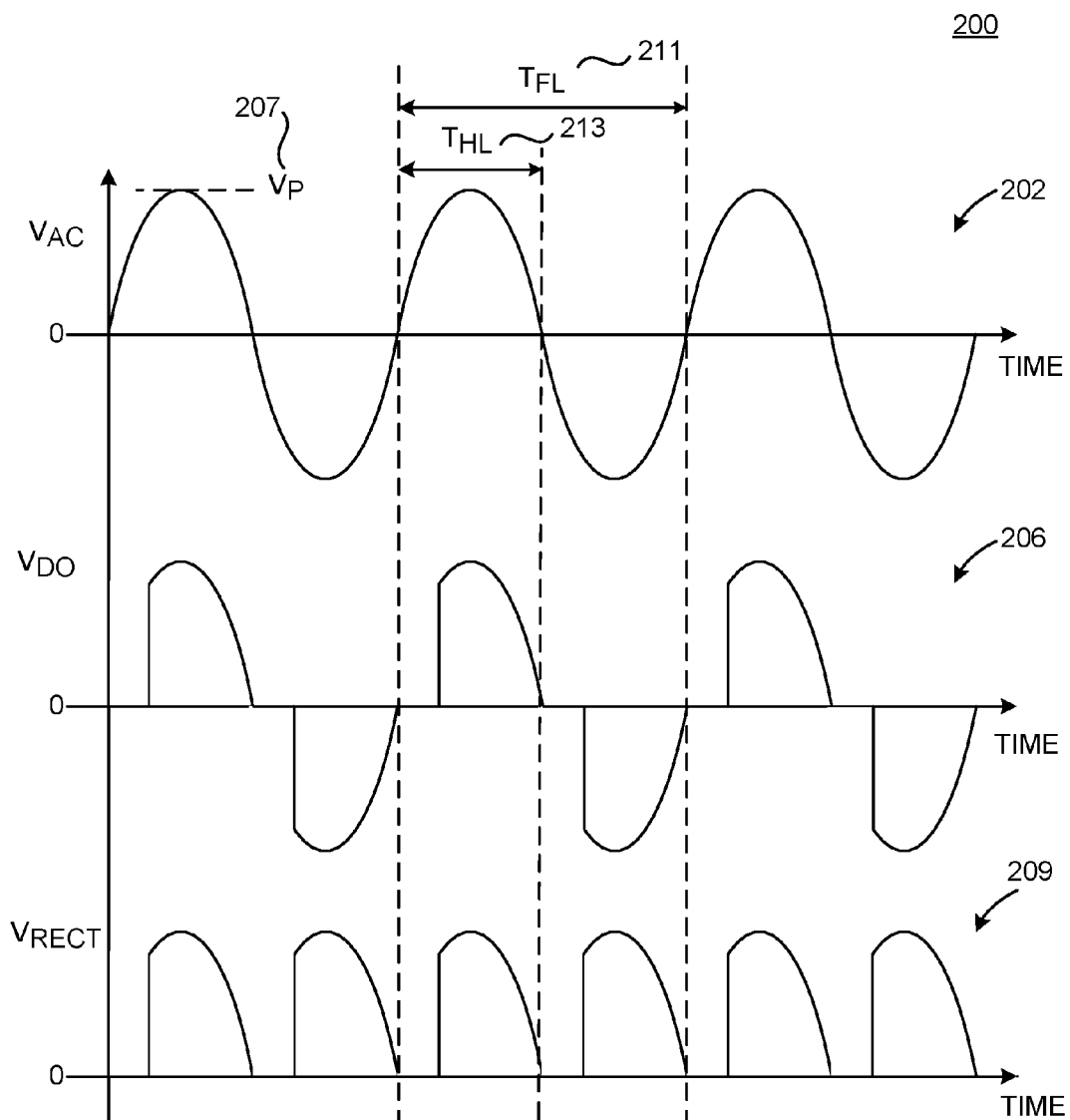
FIG. 2 is a diagram illustrating example waveforms of an ac input voltage, an output voltage of a dimmer circuit, and an output of a rectifier circuit of FIG. 1, in accordance with the teachings of the present invention.

FIG. 2 illustrates example waveforms of an ac input voltage 202, a dimmer output voltage $V_{DO}$ 206, and a rectified voltage $V_{RECT}$ 209. In particular, FIG. 2 illustrates the dimmer output voltage $V_{DO}$ 206 and a resultant rectified voltage $V_{RECT}$ 209 for leading edge triac dimming.

In general, the ac input voltage $V_{AC}$ 202 is a sinusoidal waveform with the period of the ac input voltage $V_{AC}$ 202 referred to as a full line cycle $T_{FL}$ 311. Mathematically: $V_{AC}=V_P \sin(2\pi f_L t)$, where $V_P$ 207 is the peak voltage of the ac input voltage $V_{AC}$ and $f_L$ is the frequency of the ac input voltage. It should be appreciated that the full line cycle $T_{FL}$ 211 is the reciprocal of the line frequency $f_L$, or mathematically:

$$T_{FL} = \frac{1}{f_L}.$$

As shown in FIG. 2, a full line cycle $T_{HL}$ 211 of the ac input voltage 202 is denoted as the length of time between every other zero-crossing of the ac input voltage 202. Further, the half line cycle $T_{HL}$ 213 is the reciprocal of double the line frequency, or mathematically:

$$T_{HL} = \frac{1}{2f_L}.$$

As shown, the half line cycle $T_{HL}$ 213 of the ac input voltage $V_{AC}$ 202 is denoted as the length of time between consecutive zero-crossings.

For leading edge dimming, the dimmer circuit 104 disconnects the ac input voltage $V_{AC}$ 202 from the power converter when the ac input voltage $V_{AC}$ 202 crosses zero voltage. After a given amount of time, the dimmer circuit 104 reconnects the ac input voltage $V_{AC}$ 202 with the power converter 100 and the dimmer output voltage $V_{DO}$ 206 substantially follows the ac input voltage $V_{AC}$ 202. In other words, the dimmer circuit 104 disconnects the ac input voltage 202 for a portion of the half line cycle to provide the dimmer output voltage $V_{DO}$ 206 thus limiting the amount of power supplied to a load (such as an LED lamp). The rectifier circuit 108 rectifies the dimmer output voltage $V_{DO}$ 206 thus providing the rectified voltage $V_{RECT}$ 209 as shown. For the example of FIG. 2, the beginning of each half line cycle $T_{HL}$ 213 of the rectified voltage $V_{RECT}$ 209 is substantially equal to zero voltage corresponding to when the dimmer circuit 104 disconnects the ac input voltage $V_{AC}$ 202 from the power converter. When the dimmer circuit 104 reconnects the ac input voltage $V_{AC}$ 102 to the power converter, the rectified voltage $V_{RECT}$ 209 substantially follows the positive magnitude of the dimmer output voltage $V_{DO}$ 206 and the ac input voltage $V_{AC}$ 202. Or mathematically: $V_{RECT}=|V_{DO}|$.

Figure 3A:
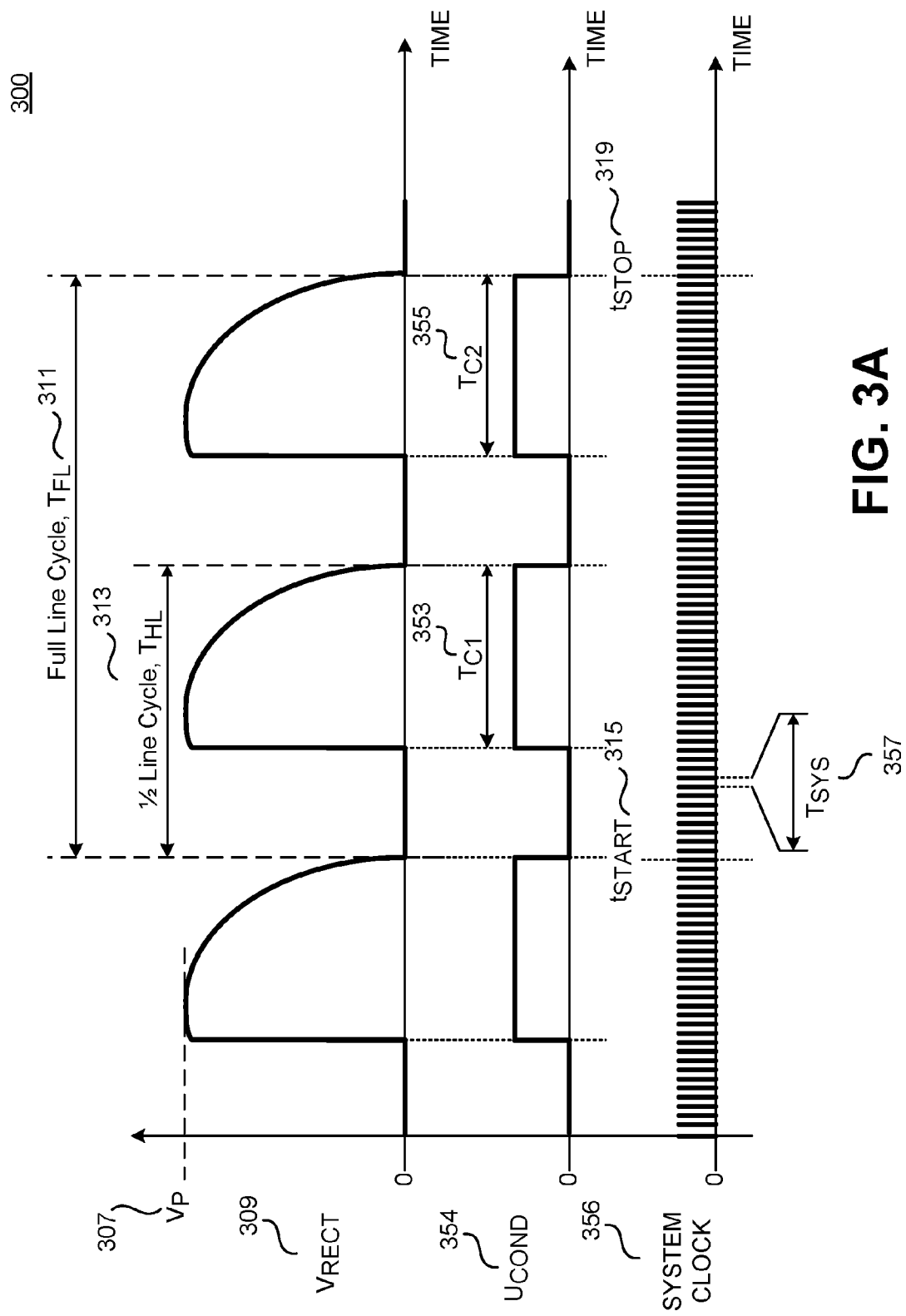
FIG. 3A is a diagram illustrating example waveforms of a rectified input voltage waveform, a system clock, and resultant conduction signal of the power converter of FIG. 1, in accordance with the teachings of the present invention.

Referring next to FIG. 3A, example waveforms of the rectified voltage $V_{RECT}$ 309, conduction signal $U_{COND}$ 354, and system clock 356 of the switching power converter 100 are illustrated including full line cycle $T_{FL}$ 311, half line cycle $T_{HL}$ 313, a peak voltage $V_P$ 307, a start time $t_{START}$ 315, a stop time $t_{STOP}$ 319, a first conduction length $T_{C1}$ 353, a second conduction length $T_{C2}$ 355, and system period $T_{SYS}$ 357. FIG. 3A illustrates the example rectified voltage $V_{RECT}$ 309 for a leading edge dimmer circuit.

The beginning of each half line cycle $T_{HL}$ 313 of the rectified voltage $V_{RECT}$ 309 is substantially equal to zero voltage corresponding to when the dimmer circuit 104 disconnects the ac input voltage $V_{AC}$ from the power converter. When the dimmer circuit 104 reconnects the ac input voltage $V_{AC}$ to the power converter, the rectified voltage $V_{RECT}$ 309 substantially follows the positive magnitude of the ac input voltage $V_{AC}$. As illustrated, the conduction signal $U_{COND}$ 354 is a rectangular pulse waveform which is logic high value when the rectified voltage $V_{RECT}$ 309 is substantially not zero and is logic low when the rectified voltage $V_{RECT}$ 309 is substantially equal to zero. The conduction signal $U_{COND}$ 354 may be representative of the amount of dimming set by the dimmer circuit 104. Or in other words, the conduction signal $U_{COND}$ 354 may be representative of the conduction angle or the phase angle of the dimmer circuit 104. In another example, the conduction signal $U_{COND}$ 354 may be representative of the dimmer circuit conduction (or the connecting or disconnecting of the input from the power converter). In one example, the conduction signal $U_{COND}$ 354 may be generated by comparing the rectified voltage $V_{RECT}$ 309 with a threshold (not shown). The conduction signal $U_{COND}$ 354 may be logic high when the rectified voltage $V_{RECT}$ 309 is greater than the threshold or logic low when the rectified voltage $V_{RECT}$ 309 is less than the threshold (or vice versa). The conduction signal $U_{COND}$ 354 may also be generated from current sense signal 152.

The system clock 356 is a rectangular pulse waveform of varying lengths of logic high and logic low sections. The length of time between consecutive rising edges of the system clock 356 is substantially equal to the system period $T_{SYS}$ 357. As illustrated, the frequency $f_{SYS}$ of the system clock 356 is much greater than the line frequency $f_L$ of the ac input voltage VAC. The system period $T_{SYS}$ 357 is the reciprocal of the frequency, as such the system period $T_{SYS}$ 357 is shorter than the full line cycle $T_{FL}$ 311 of the ac input voltage $V_{AC}$ and the rectified voltage $V_{RECT}$ 309. FIG. 3A illustrates the system clock 356 as notches to demonstrate that the system period $T_{SYS}$ 357 is shorter than the full line cycle $T_{FL}$ 311. In one example the full line cycle $T_{FL}$ 311 is $2^{12}$ times greater than the system period $T_{SYS}$ 357 of the system clock 156.

As will be discussed, examples of the invention determine the length of the time which the dimmer circuit 104 is conducting over a full line cycle $T_{FL}$ 311. In one example, the variable reference generator 136 discussed above includes a counter which counts the length of time which the conduction signal $U_{COND}$ 354 is logic high (or vice versa). The counter may begin counting at the beginning of a full line cycle $T_{FL}$ 311, denoted as the start time $t_{START}$ 315 and stops counting at the end of the full line cycle $T_{FL}$ 311, denoted as the stop time $t_{STOP}$ 319. In one example, the counter counts the first conduction length $T_{C1}$ 353 and the second conduction length $T_{C2}$ 355. The sum of the first conduction length $T_{C1}$ 353 and the second conduction length $T_{C2}$ 355 may be utilized to determine the dimmer circuit conduction time over the full line cycle $T_{FL}$ 311. Or in other words, the first conduction length $T_{C1}$ 353 and the second conduction length $T_{C2}$ 355 may be utilized to determine the dimmer circuit conduction time over two half line cycles $T_{HL}$ 313. As will be further discussed, the counter may increment its value when the conduction signal $U_{COND}$ 354 is logic high. The counter may not increment its value when the conduction signal $U_{COND}$ 354 is logic low. Alternatively, the counter may decrement its value when the conduction signal $U_{COND}$ 354 is logic low. It should be appreciated that over a full line cycle or two half line cycles, the first conduction length $T_{C1}$ 353 and the second conduction length $T_{C2}$ 355 may not be the same. In some cases, due to the properties of dimmer circuits, the dimmer output $V_{DO}$ (and therefore the rectified voltage $V_{RECT}$ 309) may be asymmetrical over a full line cycle or two half line cycles. For example, the dimmer circuit may oscillate between a long conduction time followed by a short conduction time. Examples of the present invention may average the conduction times over an even number of half line cycles to regulate the output of the power converter. As such, the effects of an asymmetrical dimmer circuit may be reduced.

The speed at which the counter may increment may be determined by the system clock 356. The controller may fix the total possible count for a full line cycle $T_{FL}$ 311. For the example, the total count for a full line cycle $T_{FL}$ 311 is related to the ratio between the frequency (or period) of the switching clock 356 to the frequency of the ac input $V_{AC}$ (or the full line cycle $T_{FL}$ 311). The oscillator frequency $f_{SYS}$ may be chosen to be a multiple of the half line frequency $f_{HL}$, or the full line frequency $f_{FL}$, or mathematically: $f_{OSC} = Cf_{FL}$, $C>1$, where C is a positive integer. In other words, the full line cycle $T_{FL}$ 311 is a multiple of the system period $T_{SYS}$ 357, or mathematically:

$$T_{SYS} = \frac{1}{C} T_{FL}, C > 1.$$

The total count, C per a full line cycle $T_{FL}$ 311 may be chosen such that the percentage error per count is within acceptable tolerance levels. The greater the total count per full line cycle $T_{FL}$ 311, the smaller the percentage error per count, or mathematically: error per count (expressed as a percentage)=1/C(100), where C is the total count for the full line cycle $T_{FL}$ 311. If the total count for the full line cycle $T_{FL}$ 311 is equal to 100 the percentage error per count would be 1%. If the total count for the full line cycle $T_{FL}$ 311 is equal to 320 counts, the percentage error per count would be 0.31%. In one example, the total count C is substantially $2^{12}$ or 4096.

Figure 3B:
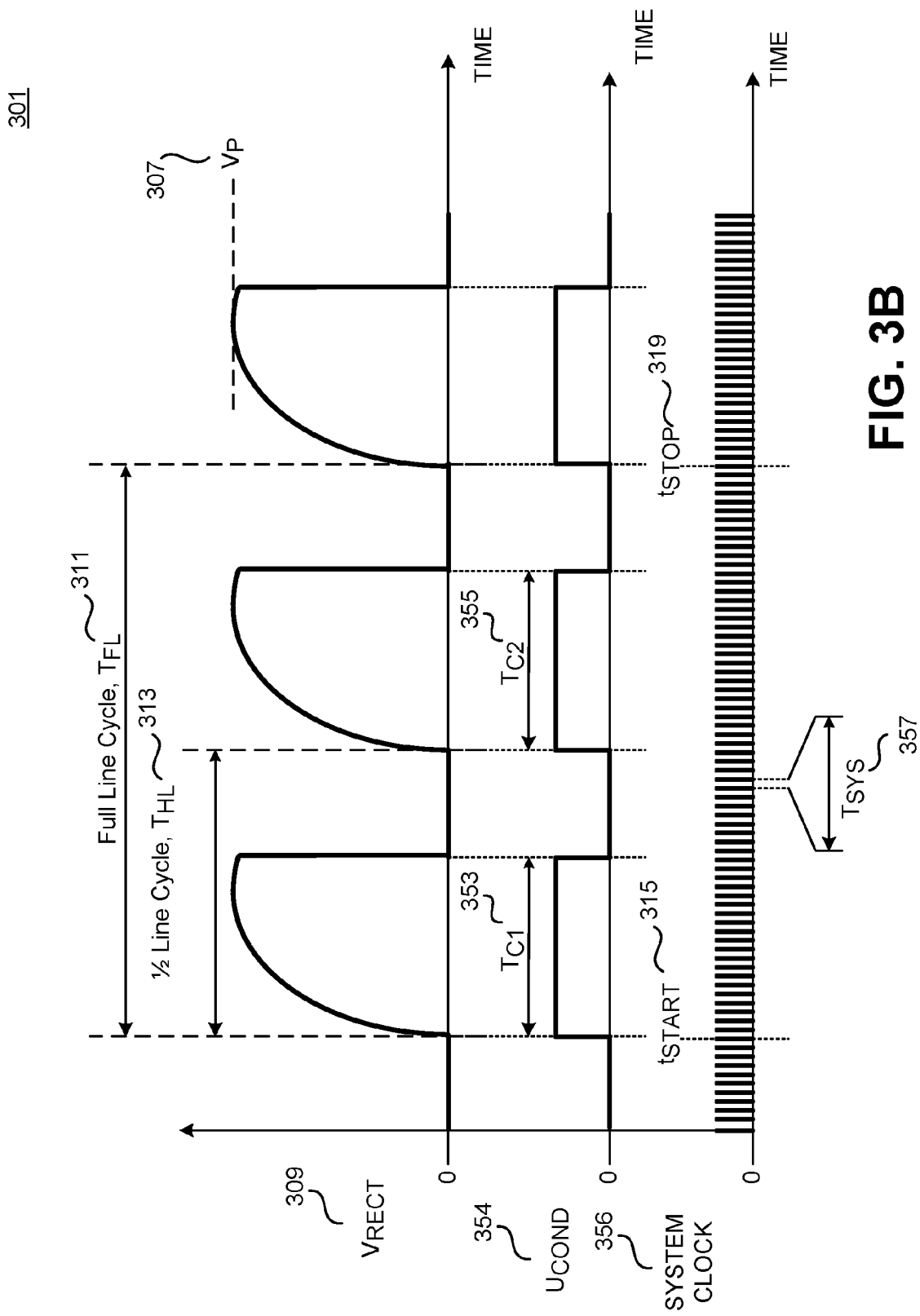
FIG. 3B is a diagram illustrating further example waveforms of a rectified input voltage waveform, a system clock, and resultant conduction signal of the power converter of FIG. 1, in accordance with the teachings of the present invention.

Referring next to FIG. 3B, other example waveforms of the rectified voltage $V_{RECT}$ 309, conduction signal $U_{COND}$ 354, and system clock 356 of the switching power converter 100 are illustrated including full line cycle $T_{FL}$ 311, half line cycle $T_{HL}$ 313, a peak voltage $V_P$ 307, a start time $t_{START}$ 315, a stop time $t_{STOP}$ 319, a first conduction length $T_{C1}$ 353, a second conduction length $T_{C2}$ 355, and system period $T_{SYS}$ 357. FIG. 3B illustrates the example rectified voltage $V_{RECT}$ 309 for a trailing edge dimmer circuit. FIG. 3B is similar to FIG. 3A, however the dimmer circuit connects the input to the power converter when the ac input voltage $V_{AC}$ crosses zero voltage and after a given amount of time, the dimmer circuit then disconnects the ac input voltage $V_{AC}$ for the remainder of the half line cycle $T_{HL}$ 313. At the beginning of the half line cycle $T_{HL}$ 313, the rectified voltage $V_{RECT}$ 309 substantially follows the positive magnitude of the ac input voltage $V_{AC}$ until the dimmer circuit disconnects the ac input voltage $V_{AC}$ from the power converter. The value of the rectified voltage $V_{RECT}$ 309 then falls to substantially zero voltage until the beginning of the next half line cycle. In other words, at the beginning of the half line cycle $T_{HL}$ 313, the dimmer circuit is conducting and the conduction signal $U_{COND}$ 354 is logic high.

Figure 4:
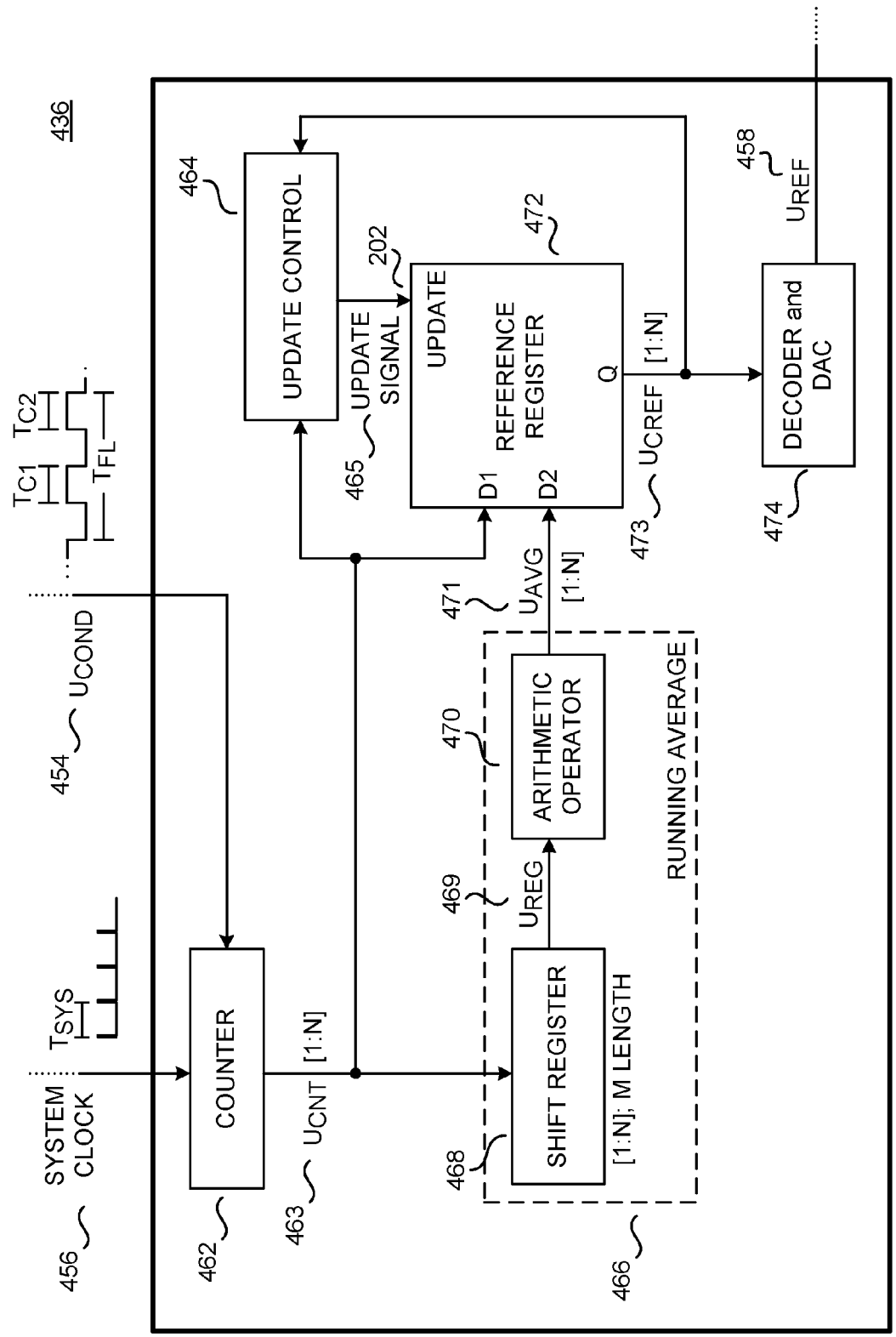
FIG. 4 is a functional block diagram of a variable reference generator, in accordance with the teachings of the present invention.

FIG. 4 illustrates an example variable reference generator 436 including a counter 462, an update control block 464, a running average block 466, a reference register 472, and a decoder and digital to analog converter (DAC) block 474. The running average block 466 further includes a shift register 468 and an arithmetic operator 470, in FIG. 4. Also illustrated in FIG. 4 are conduction signal $U_{COND}$ 454, system clock 456, a count value $U_{CNT}$ 463, a register output signal $U_{REG}$ 469, an average signal $U_{AVG}$ 471, an update control signal 465, a count reference signal $U_{CREF}$ 473, and the feedback reference signal $U_{REF}$ 458. Variable reference generator 436 is one example of the variable reference generator 136 shown in FIG. 1.

In the illustrated example, variable reference generator 436 is coupled to receive conduction signal $U_{COND}$ 454 and generate count value $U_{CNT}$ 463 in response to a first conduction time (e.g. $T_{C1}$ 353, $T_{C2}$ 355) of conduction signal $U_{COND}$ 454. To generate count value $U_{CNT}$ 463, counter 462 may increment for every system clock when conduction signal $U_{COND}$ 454 is asserted at a high logic level during a full line cycle. Variable reference generator 436 is coupled to output feedback reference signal $U_{REF}$ 458 in response to the current count value $U_{CNT}$ 463 (which may be a 12-bit number) and in response to prior count values stored in variable reference generator 436. In FIG. 4, the prior count values are representative of prior conduction times of conduction signal $U_{COND}$ 454 and are stored in shift registers 468. As will be further discussed, example variable reference generator 436 averages count value $U_{CNT}$ 463 over multiple full line cycles of the ac input voltage $V_{AC}$. In addition, the variable reference generator 436 also determines whether to update the feedback reference signal $U_{REF}$ 458 to substantially equal the averaged conduction signal $U_{AVG}$ 471.

Counter 462 is coupled to receive the system clock 456 and the conduction signal $U_{COND}$ 454. As mentioned above, the conduction signal $U_{COND}$ 454 provides information regarding whether the dimmer circuit is conducting (i.e. the input is connected to the power converter) or not conducting (i.e. the input is disconnected from the power converter). The counter 462 determines the length of time which the dimmer circuit is conducting (or alternatively, not conducting) through the conduction signal $U_{COND}$ 454. For example, the counter 462 may determine the length of time which the conduction signal $U_{COND}$ 454 is logic high (or vice versa). One example of counter 462 may be a binary counter.

Counter 462 may increment in response to the system clock 456. Or in other words, the increments with every cycle system period $T_{SYS}$ of the system clock 456 of the oscillator. The counter 462 may begin counting at the beginning of a full line cycle $T_{FL}$ and end counting at the end of a full line cycle $T_{FL}$. In another example, the counter 462 may begin counting at the beginning of a half line cycle $T_{HL}$ and end at the end of the half line cycle $T_{HL}$. As illustrated by the start and stop times of FIGS. 3A and 3B, the counter 462 starts and stops counting with every other rising or falling edge of the conduction signal $U_{COND}$ 454. In one example, the counter 462 increments its value when the conduction signal $U_{COND}$ 454 is logic high. The counter 462 may not increment its value when the conduction signal $U_{COND}$ 454 is logic low. Alternatively, the counter 462 may decrement its value when the conduction signal $U_{COND}$ 454 is logic low. Once the counter has finished counting, the internal value of the counter 462 is outputted as count value $U_{CNT}$ 463 and the internal value is reset. In one example, the counter 462 may be a binary counter with N number of bits. For example, the counter 462 may be a 12-bit counter and the count value $U_{CNT}$ 463 is a 12-bit binary word. Optionally, the variable reference generator 436 may include a validity block (not shown) which determines whether the conduction signal $U_{COND}$ 454 or the count signal $U_{CNT}$ 463 is a valid representation of the conduction time in a full line cycle. The validity block may be coupled before or after the counter 462, or included within the counter 462. If the validity block determines that the conduction signal $U_{COND}$ 454 or the count signal $U_{CNT}$ 463 is invalid, the conduction signal $U_{COND}$ 454 is not received by the counter 462. Or in another example, the count signal $U_{CNT}$ 463 is not outputted to the running average block 466. If the conduction signal $U_{COND}$ 454 or the count signal $U_{CNT}$ 463 is valid, the conduction signal $U_{COND}$ 454 is received by the counter 462 or the count signal $U_{CNT}$ 463 is outputted to the running average block 466.

Running average block 466 is coupled to receive the count value $U_{CNT}$ 463 from the counter 462. Although not shown, the running average block 466 is also coupled to receive the system clock 456. Running average block 466 generates a central tendency value (e.g. average, weighted average, median, mode) of the current count value $U_{CNT}$ 463 and a quantity of prior count values $U_{CNT}$ 463. In one example, the running average block 466 is coupled to generate the average signal $U_{AVG}$ 471 which is the average value of the count value $U_{CNT}$ 463 over eight full line cycles $T_{FL}$. In another example, the running average block 466 is coupled to generate the average signal $U_{AVG}$ 471 which is the average value of the count value $U_{CNT}$ 463 over two half line cycle $T_{HL}$ (or one full line cycle $T_{FL}$). The running average block 466 in FIG. 4 includes the shift register 468 which is coupled to receive and save the count value $U_{CNT}$ 463 from the counter 462. In one example, the shift register 468 may be an N-bit shift register of M length. Or in other words, the shift register 468 may store the count value $U_{CNT}$ 463 from M number of half line cycles $T_{HL}$ or full line cycles $T_{FL}$. The output of the shift register (register output $U_{REG}$ 469) is received by the arithmetic operator 470. In one example, the arithmetic operator sums each of the M number of the stored count values $U_{CNT}$ and divides by M to generate the average signal $U_{AVG}$ 471. A specific example of the running average block 466 will be further discussed with respect to FIG. 5. Those skilled in the art appreciate that running average block 466 is only one example of generating a central tendency value and logic other than shift registers may be used to generated a central tendency value from the current count value and prior count values. In one embodiment, a microcontroller configured to run central tendency algorithms in firmware is used as running average block 466 to generate a central tendency value.

Reference register 472 is coupled to receive the count value $U_{CNT}$ 463 from the counter 462, the average signal $U_{AVG}$ 471 from the running average block 466, and the update control signal 465 from the update control block 464. The internal value of the reference register 472 is outputted as count reference signal $U_{CREF}$ 473. The reference register 472 may select the current count value $U_{CNT}$ 463 rather than the average signal $U_{AVG}$ 471 as the count reference signal $U_{CREF}$ 473. In one example, reference register 472 selects the current count value $U_{CNT}$ 463 rather than the average signal $U_{AVG}$ 471 during start-up conditions when the shift register 468 of the running average block 466 is not full. The reference register 472 further updates the count reference signal $U_{CREF}$ 473 in response to the update control signal 465. When the update control signal 465 indicates to the reference register 472 to update, the count reference signal $U_{CREF}$ 473 is updated to substantially equal the average signal $U_{AVG}$ 471. In another example, the average signal $U_{AVG}$ 471 may be received by the decoder and DAC 474 without the use of the update control block 464 and the reference register 472.

Update control block 464 is coupled to receive the count value $U_{CNT}$ 463 from the counter 462 and the count reference signal $U_{CREF}$ 473 from the reference register 472. As will be discussed in further detail with respect to FIG. 6, the update control block 464 compares the count value $U_{CNT}$ 463 and the count reference signal $U_{CREF}$ 473. Update control block 464 is coupled to update reference register 472 with the central tendency value (e.g. average signal $U_{AVG}$ 471) when certain conditions are met. In one example, update control block 464 asserts the update control signal 465 (which causes reference register to be updated with average signal $U_{AVG}$ 471) if the count value $U_{CNT}$ 463 is above or below the count reference signal $U_{CREF}$ 473 for a given quantity (e.g. 16) of consecutive full line cycles $T_{FL}$. In addition, the update control block 464 may assert the update control signal 465 sooner if the difference between the count value $U_{CNT}$ 463 and the count reference signal $U_{CREF}$ 473 is large enough. In another example, the greater the difference between the count value $U_{CNT}$ 463 and the count reference signal $U_{CREF}$ 473, the quicker the update control block 464 asserts the update control signal 465.

Decoder and DAC block 474 is coupled to receive the count reference signal $U_{CREF}$ 473 from the reference register 472 and convert the digital count reference signal $U_{CREF}$ 473 to an analog feedback reference signal $U_{REF}$ 458. In addition, the decoder and DAC 474 process the count reference signal $U_{CREF}$ 473 to map the digital value of the count reference signal $U_{CREF}$ 473 to the analog value of the feedback reference signal $U_{REF}$ 458. For example, the count reference signal $U_{CREF}$ 473 may be representative of the dimmer circuit conduction time. The smaller the conduction time, the more dimming is desired. In this example, the decoder and DAC 474 may keep the feedback reference signal $U_{REF}$ 458 until the count reference signal $U_{CREF}$ 473 is less than a threshold. Then the feedback reference signal $U_{REF}$ 458 may decrease as the count reference signal $U_{CREF}$ 473 decreases. It should be appreciated that the rate of decrease may vary and may be linear or non-linear.

Figure 5:
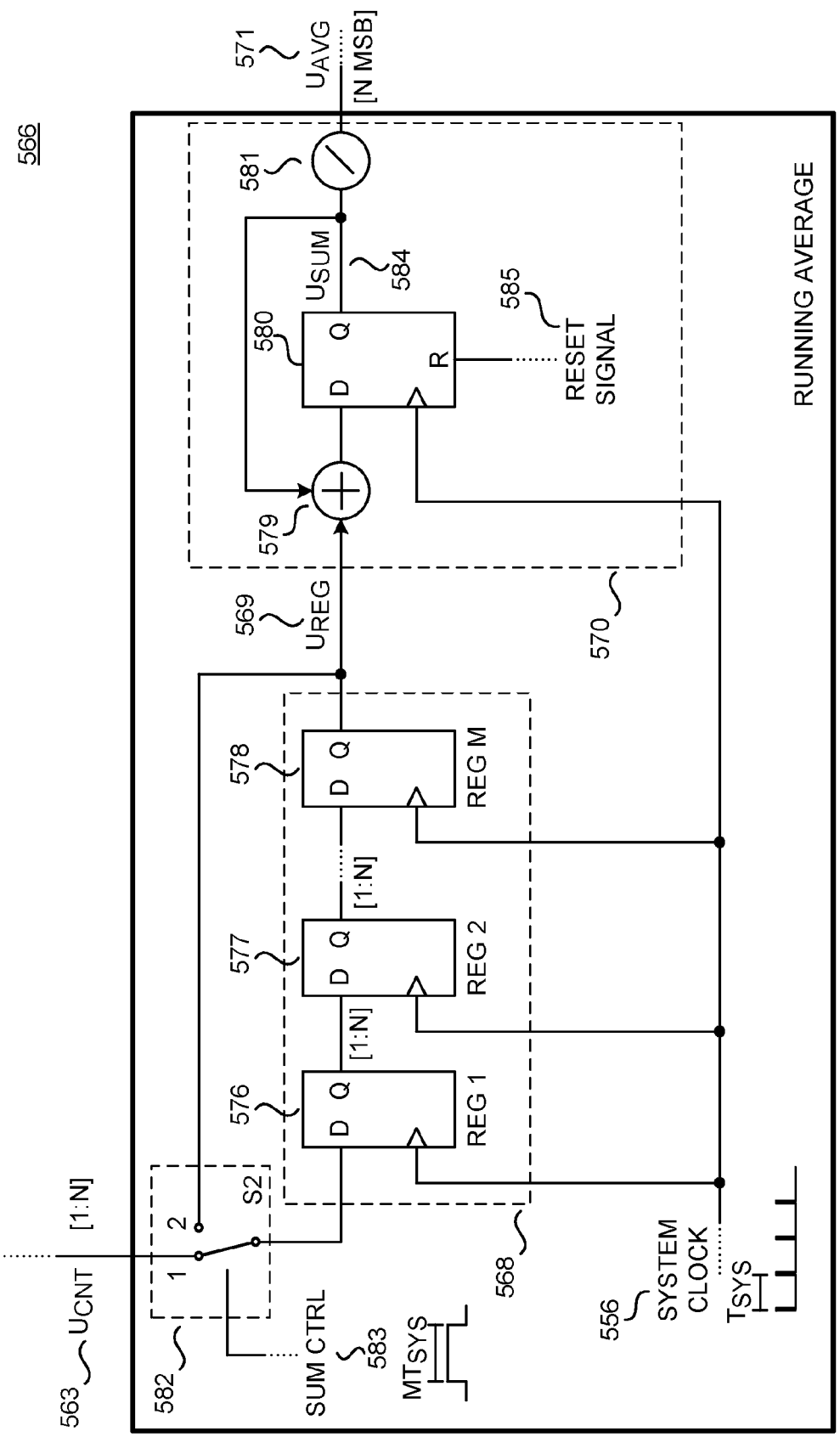
FIG. 5 is a function block diagram of a running average circuit of the variable reference generator of FIG. 4, in accordance with the teachings of the present invention.

FIG. 5 illustrates a running average circuit 566 including a switch S2 582, a shift register 568, and arithmetic operator 570. As shown, the shift register 568 may include M number of registers 576, 577, and 578. The arithmetic operator 570 may include an adder 579, a register 580, and a divider 581. Further shown in FIG. 5 is system clock 556, count value $U_{CNT}$ 563, register output signal $U_{REG}$ 569, average signal $U_{AVG}$ 571, a sum controls signal 583, a summed signal $U_{SUM}$ 584, and a reset signal 585. Running average circuit 566, shift register 568, and arithmetic operator 570 are one example of the running average circuit 466, shifter register 468, and arithmetic operator 470 illustrated n FIG. 4. It should be appreciated that this is one example of generating the running average of the count value $U_{CNT}$ 563 over a period of time.

Switch S2 582 is coupled to receive the count value $U_{CNT}$ 563. In one example, the switch S2 582 is a three terminal switch. When the switch S2 582 is in position 1, the count value $U_{CNT}$ 563 is received by the shift register 576. In particular, the count value $U_{CNT}$ 563 is received at the D-input of the first register 576. However, when the switch S2 582 is in position 2, the shift register 568 (and the running average circuit 566) is disconnected from receiving the count value $U_{CNT}$ 563 (or in other words, disconnected from the counter). Rather, the shift register 568 receives its own output. As illustrated, the D-input of the first register 576 is coupled to receive the Q-output of the Mth register 578 (or in other words, the register output signal $U_{REG}$ 569). The switch S2 582 is controlled by the sum control signal 583. The sum control signal is a rectangular pulse waveform with logic high and logic low sections. In one example, the length of the logic high section is substantially equal to M times the system clock period $T_{SYS}$, where M is the number of registers which store the M number of count values $U_{CNT}$ over M full line cycle $T_{FL}$. In one example, the switch S2 582 transitions to position 2 such that the arithmetic operator 570 may sum the M number of count values $U_{CNT}$ stored in registers 576, 577, and 578.

The shift register 568 includes M number of registers 576, 577, and 578 which are cascaded together. In one example, each of the registers 576, 577, and 578 are N-bit registers. As illustrated, the D-input of the first register 576 is coupled to the switch S2 582 and may receive either the count value $U_{CNT}$ 563 or the register output $U_{REG}$ 569. The Q-output of the first register 576 is coupled to the D-input of the second register 577 and so on until the Q-output of the M-1 register (not shown) is coupled to be received by the D-input of the Mth register 578. The Q-output of the Mth register 578 is the register output $U_{REG}$ 569. Each of the registers 576, 577, and 578 are also coupled to receive the system clock 556 at their respective clock inputs. In one example, each of the registers 576, 577, and 578 are coupled to store the count value $U_{CNT}$ 563 over M number of full line cycles $T_{FL}$. For example, the shift register 568 may receive the count value $U_{CNT}$ 563 and store the count value $U_{CNT}$ 563 in the first register 576 during a full line cycle $T_{FL}$. At the next full line cycle, the count value $U_{CNT}$ 563 which was stored in the first register 576 is then transferred to the second register 577 and the new count value $U_{CNT}$ 563 is stored in the first register 576. In other words, a count value $U_{CNT}$ 563 may be stored for M number of full line cycles $T_{FL}$. The registers 576, 577, and 578 update and store their values in response to the system clock 556.

For the example shown, the adder 579 is coupled to receive the output of the shift register 578 (register output $U_{REG}$ 569). The adder 579 is also coupled to receive the summed signal $U_{SUM}$ 584 from the Q-output of the register 580. The D-input of the register 580 is coupled to receive the output of the adder 579. As illustrated, the register 580 is also coupled to receive the reset signal 585 which resets the internal value of the register 580. The register 580 is also coupled to be updated in response to the received system clock 556 at its clock input. Divider 581 is coupled to receive the summed signal $U_{SUM}$ 584 and output the average signal $U_{AVG}$ 571.

In operation, when the running average circuit 566 is calculating the average value of the count values $U_{CNT}$ stored in the shift register 568, the switch S2 582 is set to position 2 for M number of system periods, $MT_{SYS}$. Initially, the register 580 is reset to substantially zero. Or in other words, the summed signal $U_{SUM}$ 584 is substantially equal to zero. For the first system period $T_{SYS}$ after the switch S2 582 is in position 2, the adder 579 sums the value of the count value $U_{CNT}$ stored in the Mth register 578 with the summed signal summed signal $U_{SUM}$ 584 (which is substantially zero). The value stored in register 580 is then substantially equal to the value of the count value $U_{CNT}$ originally stored in the Mth register 578. At the second system $T_{SYS}$ after the switch S2 582 is in position 2, the shift register 568 shifts each stored count value $U_{CNT}$ to the next register. The value of the count value $U_{CNT}$ originally stored in the Mth register is then stored to the first register 576 and value of the count value $U_{CNT}$ originally stored in the M-1 register (not shown) is now stored in the Mth register 578 and so on until the value of the count value $U_{CNT}$ originally stored in the first register 576 is stored in the second register 577. At the same time, the adder 579 is now summing the register output 569 (which is representative of the value of the count value $U_{CNT}$ originally stored in the M-1 register) with the summed signal $U_{SUM}$ 584 (which is representative of the value of the count value $U_{CNT}$ originally stored in the Mth register 578). The output of the adder is now the sum of the values of the count value $U_{CNT}$ originally stored originally in the Mth register 578 and the M-1 register (not shown). The process continues for a total of M system periods, $MT_{SYS}$, until the summed signal $U_{SUM}$ 584 is a sum of all the values of the count value $U_{CNT}$ originally stored in each register (576, 577, and 578) of the shift register 568. Alternatively, the adder 579 may have M number of inputs which receive the Q-outputs of each of the M registers (576, 577, and 578) and may add the outputs of each register in parallel to generate the summed signal $U_{SUM}$ 584 which is the sum of all the values of the count value $U_{CNT}$ originally stored in each register (576, 577, and 578) of the shift register 568.

The summed signal $U_{SUM}$ 584 is then divided by M by divider 581 to generate the average signal $U_{AVG}$ 571. In one example, the count value $U_{CNT}$ 563, register output $U_{REG}$ 569, and the summed signal $U_{SUM}$ 584 are digital words. Dividing by M of a digital word may be accomplished by dropping the $\log_2$ M least significant bits (LSB) of the summed signal $U_{SUM}$ 584. In one example, M is substantially equal to 8. To divide by 8, the 3 least significant bits are dropped.

Figure 6:
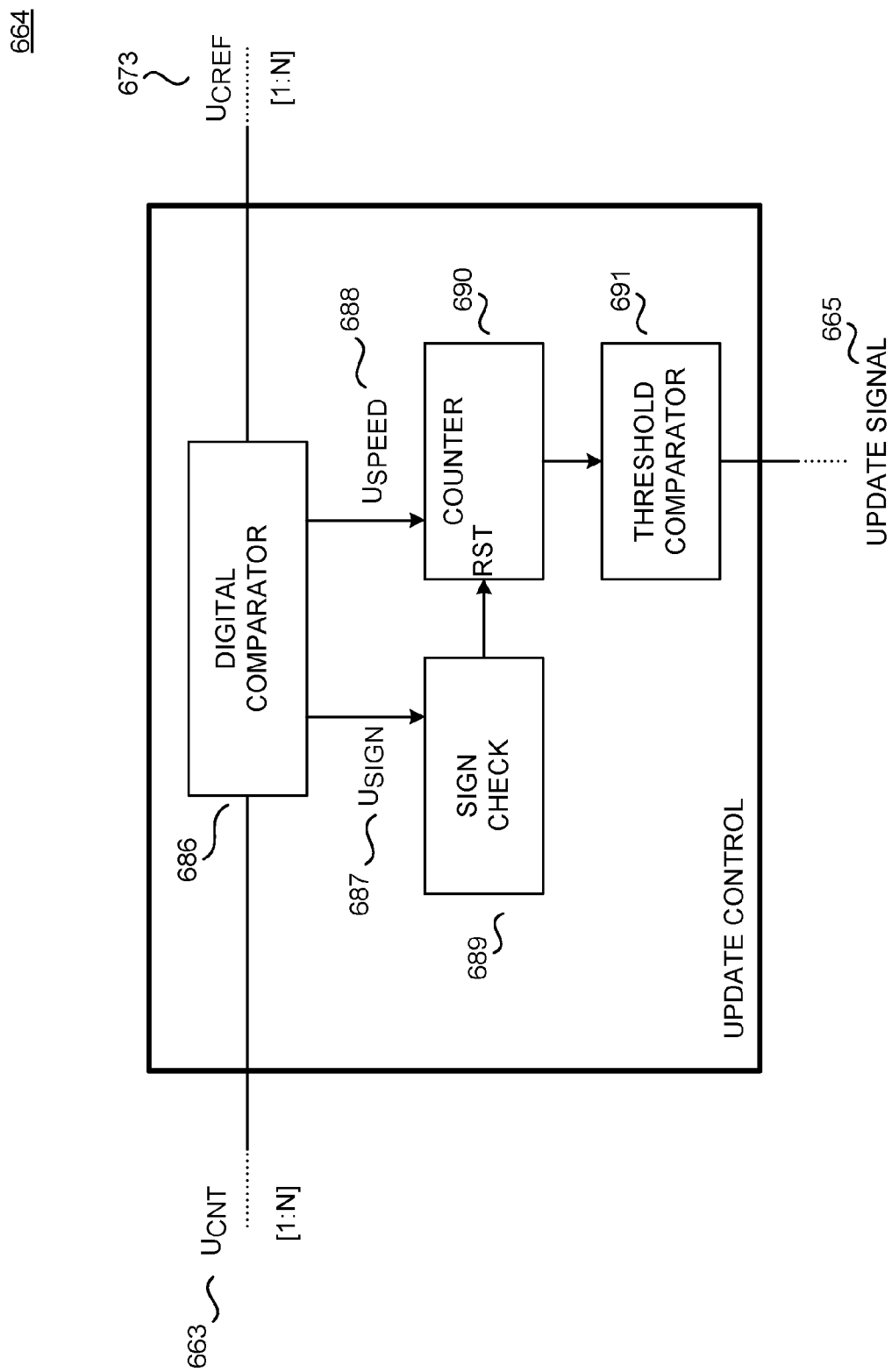
FIG. 6 is a functional block diagram of an update control circuit of the variable reference generator of FIG. 4, in accordance with the teachings of the present invention.

FIG. 6 illustrates an update control block 664 including a digital comparator 686, a sign check block 689, a counter 690, and a threshold comparator 691. Further shown in FIG. 6 is count value $U_{CNT}$ 663, count reference signal $U_{CREF}$ 673, an update signal 665, a sign signal $U_{SIGN}$ 687, and a speed signal $U_{SPEED}$ 688. The update control block 664 is one example of the update control block 464 illustrated in FIG. 4.

Digital comparator 686 is coupled to receive the count value $U_{CNT}$ 663 and the count reference signal $U_{CREF}$ 673. In one example, both the count value $U_{CNT}$ 663 and the count reference signal $U_{CREF}$ 673 are N-bit digital words. In one example, the digital comparator 686 compares the count value $U_{CNT}$ 663 and the count reference signal $U_{CREF}$ 673 and outputs the sign signal $U_{SIGN}$ 687 and the speed signal $U_{SPEED}$ 688 in response to the comparison.

In one example, the sign signal $U_{SIGN}$ 687 is representative of whether the count value $U_{CNT}$ 663 is greater than the count reference signal $U_{CREF}$ 673 and vice versa. For example, the sign signal $U_{SIGN}$ 687 may be a digital zero if the count reference signal $U_{CREF}$ 673 is greater than the count value $U_{CNT}$ 663 or a digital one if the count value $U_{CNT}$ 663 is greater than the count reference signal $U_{CREF}$ 673 or vice versa.

The speed signal $U_{SPEED}$ 688 may be representative of the difference between the count value $U_{CNT}$ 663 and the count reference signal $U_{CREF}$ 673. In one example, the speed signal $U_{SPEED}$ 688 may be representative of the absolute value of the difference between the count value $U_{CNT}$ 663 and the count reference signal $U_{CREF}$ 673. The speed signal $U_{SPEED}$ 688 may then indicate to the counter 690 how much to increment (or decrement) its internal value. In one example, the larger the difference between the count value $U_{CNT}$ 663 and the count reference signal $U_{CREF}$ 673, the larger the value which the speed signal $U_{SPEED}$ 688 may indicate for the counter 690 to increment (or decrement). In another example, if the difference between the count value $U_{CNT}$ 663 and the count reference signal $U_{CREF}$ 673 is less than a fixed value, the speed signal $U_{SPEED}$ 688 may indicate for the counter 690 to increment (or decrement) by a first value. If the difference between the count value $U_{CNT}$ 663 and the count reference signal $U_{CREF}$ 673 is greater than a fixed value, the speed signal $U_{SPEED}$ 688 may indicate for the counter 690 to increment (or decrement) by a second value. The second value may be greater than the first value.

Examples where $U_{SPEED}$ 688 increments counter 690 when the difference between $U_{CNT}$ 663 and $U_{CREF}$ 673 is substantial (greater than the fixed value) allows for quick response to an obvious dimming adjustment from a user. For example, if $U_{CNT}$ 663 and $U_{CREF}$ 673 have a value of 1000 and the next two consecutive $U_{CNT}$ 663 values are 3000, it is unlikely that the large change in $U_{CNT}$ 663 is due to noise. Rather, it is likely that a user desires a significant dimming change and $U_{SPEED}$ 688 may cause counter 690 to be incremented by four instead of the usual one, due to the large difference between $U_{CNT}$ 663 (value of 3000) and $U_{CREF}$ 673 (value of 1000). This faster incrementing of counter 690 allows counter 690 to reach a threshold of threshold comparator 691 and ultimately allows controller 128 to respond faster to a user's adjustments.

The sign check 689 receives the sign signal $U_{SIGN}$ 687 and outputs a reset signal to the counter 690 if the sign of the comparison between the count value $U_{CNT}$ 663 and the count reference signal $U_{CREF}$ 673 has changed or is opposite the previous sign signal $U_{SIGN}$ 687. For example, if the count value $U_{CNT}$ 663 is greater than the count reference signal $U_{CREF}$ 673 in one full line cycle $T_{FL}$ and then the count reference signal $U_{CREF}$ 673 is greater than the count value $U_{CNT}$ 663 in the next full line cycle $T_{FL}$, the sign check 689 resets the counter 690 to zero.

The threshold comparator 691 is coupled to receive the value of the counter 690. The threshold comparator 691 compares the value of the counter 690 with a threshold. In one example, if the counter 690 is greater than the threshold, the threshold comparator 691 asserts the update signal 665 which causes reference register 472 to be updated with average signal $U_{AVG}$ 471.

The threshold of threshold comparator 691 is sixteen in one example. In that example, if $U_{SPEED}$ 688 increments count 690 only once, then the last sixteen consecutive count values $U_{CNT}$ 663 will have to be either all above or all below $U_{CREF}$ 673 to reach the threshold of sixteen. If the previous sixteen count values $U_{CNT}$ 663 had values that were both above and below $U_{CREF}$ 673, sign check 689 would have reset counter 690 and it would not have reached the threshold of eight. If a user is really adjusting the dimming signal up or down, the count values $U_{CNT}$ 663 should eventually stabilize above or below $U_{CREF}$ 673 for the necessary consecutive number (e.g. sixteen) of count values $U_{CNT}$ 663 to enable counter 690 to reach the threshold and cause reference register 472 to update with $U_{AVG}$ 471.

Figure 7:
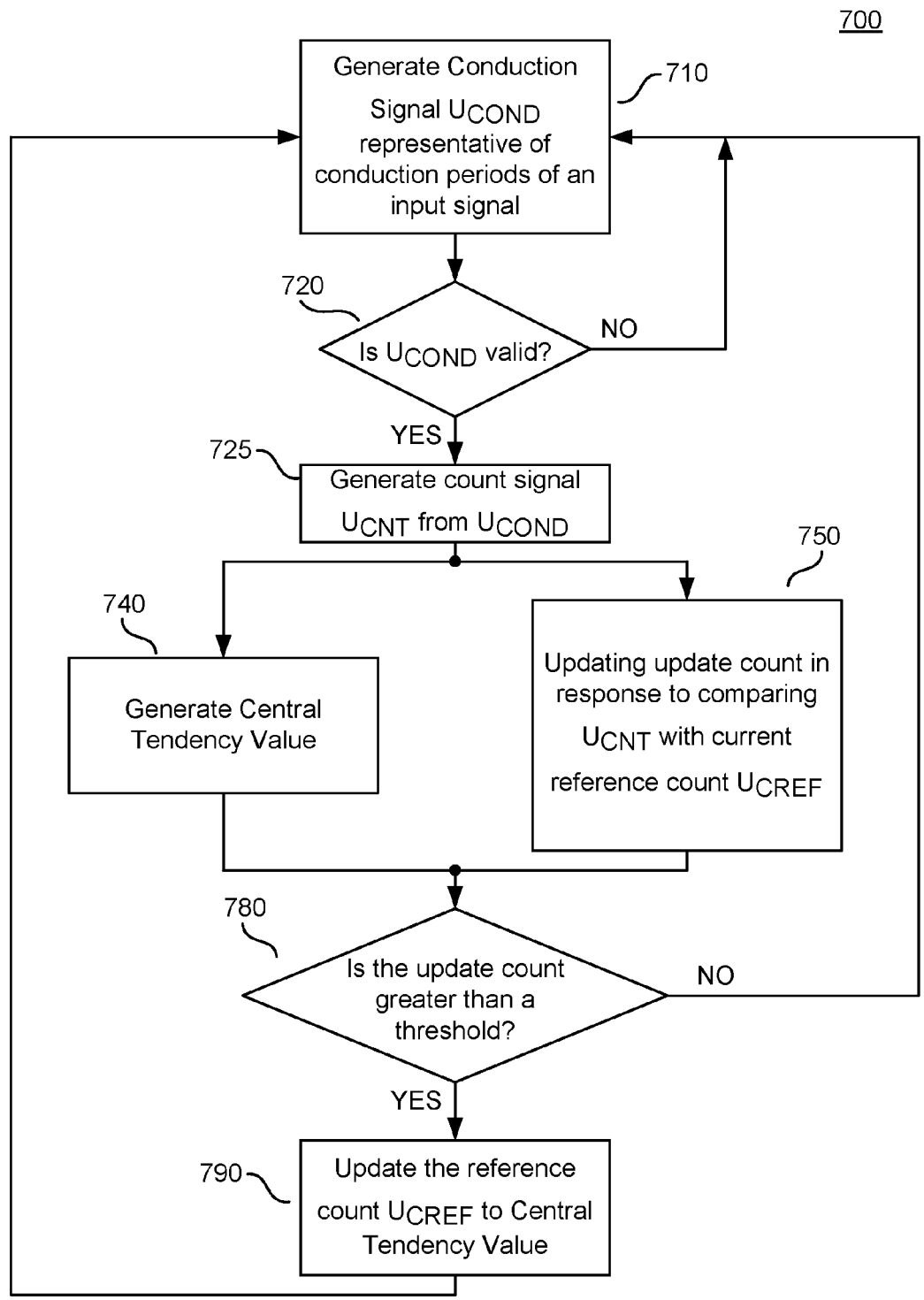
FIG. 7 is a flow diagram illustrating an example process for varying a feedback reference in response to a dimmer circuit, in accordance with the teachings of the present invention.

FIG. 7 is a flow diagram illustrating an example process 700 for varying a feedback reference in response to a dimmer circuit in accordance with an example of the present invention. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

In process block 710, a conduction signal (e.g. conduction signal $U_{COND}$ 454) is generated that is representative of conduction periods of an input signal (e.g. $V_{RECT}$ 109), which may be a dimming signal. In block 720, the process determines whether the conduction signal $U_{COND}$ is a valid signal. If the conduction signal is not valid, the process returns to block 710. If the conduction signal is valid, the process continues to block 725. In one example, the conduction signal is determined as not valid if the dimmer circuit connects and disconnects the input from the power converter more often than expected in a full or half line cycle. This may be determined by sensing the number of threshold crossings of the dimmer output voltage in a full or half line cycle. A count value (e.g. count value $U_{CNT}$ 463) is generated based on a current conduction period of the conduction signal, in process block 725. A central tendency value is generated based on the count value for current conduction period and prior count values generated by prior conduction periods in process block 740. In one example, the central tendency number is an average of the current count value of the current conduction period and the prior seven count values (from the prior seven conduction periods) that were consecutively generated immediately before the current count value. In process block 750, an update count is updated in response to comparing the current count value with the current reference count (e.g. count reference signal $U_{CREF}$ 473). In FIG. 6, the update count in counter 690 is updated by digital comparator 686 via speed signal $U_{SPEED}$ 688. In one example, of process 700 (not illustrated) the update count is reset if the current count value and a quantity (e.g. 7) of prior count values are not on the same side (i.e. either all above or all below) the current reference value. It is appreciated that process blocks 740 and 750 may be performed/executed in overlapping time periods (at the same time), in one example. Or, process block 740 may be performed/executed prior to process block 750, or vice-versa. If the count value is greater than a threshold (process block 780), the current reference count is updated with the central tendency value (process block 790). The current reference count may be updated by updating a reference register (e.g. reference register 472) with the central tendency value. If the count value is less than the threshold (process block 780), process 700 returns to process block 710.

Potential advantages of process 700 and the examples of the disclosure include providing more stable dimming control than conventional controllers. For example, controller 128 determines dimmer conduction periods rather than being reliant on the ac input voltage. The ac input voltage is subject to temporal, noise and/or regional/national voltage variations which can negatively impact a dimming controller that relies on measuring the ac input voltage. In other words, an ac input voltage variation may cause undesired dimming, brightening, or even flickering of a light source (e.g. LED light source) if a dimming controller dims/brightens the light source based on fluctuations in the ac input voltage. In contrast, dimmer conduction periods (generated by triac dimming for example) stay relatively constant even with ac input voltage fluctuations. Hence, measuring the dimmer conduction periods in accordance with the teachings of the present invention rather than measuring the ac input voltage to determine dimming level may provide a more stable indicator of the of the desired dimming level.

Another aspect of the present invention provides more stable and accurate dimming control by utilizing a central tendency value (e.g. average) of current and past conduction periods to determine dimming control. This may effectively filter out noise on inputs so that the noise does not adversely affect (e.g. flickering) the dimming of the light sources.

Figure 8:
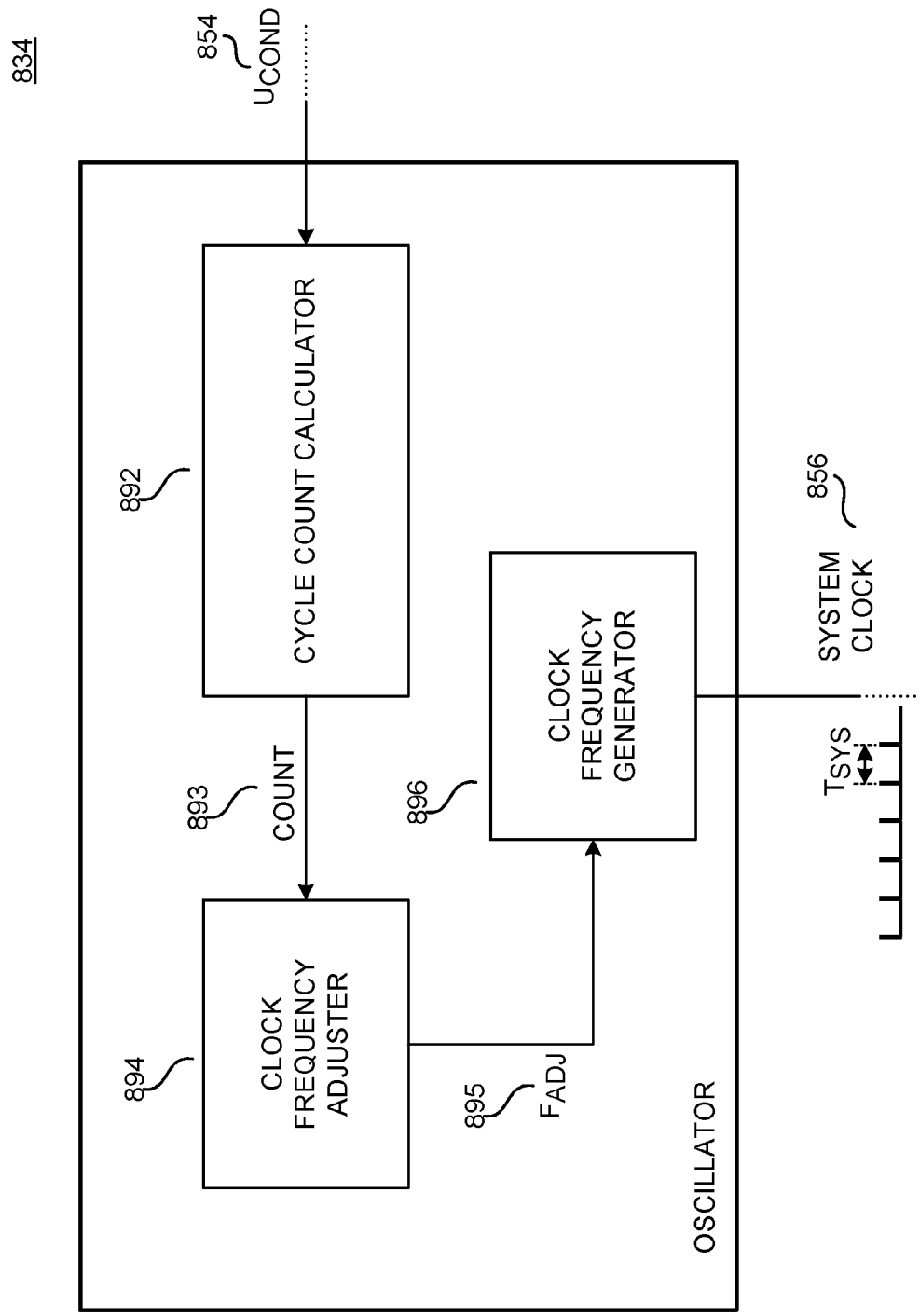
FIG. 8 is a functional block diagram of an oscillator of the controller of FIG. 1, in accordance with the teachings of the present invention.

FIG. 8 is a functional block diagram of an oscillator of the controller of FIG. 1 in accordance with an example of the present invention. As shown, oscillator 834 includes a cycle count calculator 892, a clock frequency adjuster 894, and a clock frequency generator 896. It should be appreciated that oscillator 834 and system clock 856 are examples of the oscillator 134 and system clock 156, respectively. As will be further discussed, for embodiments of the present invention, oscillator 834 adjusts the frequency (or in other words the period) of the system clock signal 856 such that the cycle count K of the clock signals is substantially constant for every full line cycle $T_{FL}$ of the ac input voltage $V_{AC}$ 102 regardless of variations to the frequency of the ac input voltage $V_{AC}$ 102. For example, the frequency of the ac input voltage $V_{AC}$ 102 in the UK is 50 Hertz (Hz) while the frequency of the ac input voltage $V_{AC}$ 102 in the US is 60 Hz. However, controller 128 may be utilized in both countries since oscillator 834 provides a substantially constant cycle count K regardless of the frequency of the ac input voltage $V_{AC}$ 102. In one embodiment, K is 4096 and oscillator 834 generates a system clock 856 with 4096 pulses for each full line cycle $T_{FL}$.

In operation, oscillator 834 outputs a system clock signal 856 in response to conduction signal $U_{COND}$ 854. Cycle count calculator 892 counts when conduction signal $U_{COND}$ 854 is at logic high and generates a count signal 893. Clock frequency adjuster 894 is coupled to receive count signal 893 and determine if the count is high or low in comparison to an expected count. Depending on count signal 893, clock frequency adjuster 894 determines whether $V_{AC}$ 102 is a first frequency (e.g. 50 Hz.) or a second frequency (e.g. 60 Hz.) and outputs frequency adjustment signal $F_{ADJ}$ 895 accordingly. In one example, clock frequency adjuster 894 may include a digital to analog converter DAC which receives the count signal 893 as a digital value and outputs frequency adjust signal $F_{ADJ}$ 895 as an analog value. In one example, frequency adjust signal $F_{ADJ}$ signal 895 may be a current with a value determined in response to count signal 893.

Clock frequency generator 896 is coupled to receive frequency adjustment signal $F_{ADJ}$ 895 and output system clock signal 856 in response. If frequency adjustment signal $F_{ADJ}$ 895 indicates that the frequency of $V_{AC}$ 102 is a first frequency (e.g. 50 Hz.), clock frequency generator 896 outputs K system clock pulses within a full line cycle of the first frequency. If frequency adjustment signal $F_{ADJ}$ 895 indicates that the frequency of $V_{AC}$ 102 is a second frequency (e.g. 60 Hz.), clock frequency generator 896 outputs K system clock pulses within a full line cycle of the second frequency. Essentially, the frequency of system clock signal 856 is adjusted such that the cycle count K of system clock signal 856 remains synchronized to the ac input voltage $V_{AC}$ 102. In one example, clock frequency generator 896 may be a variable frequency oscillator, current controlled oscillator, voltage controlled oscillator, digitally controlled oscillator or the like.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for a power converter, the controller comprising:
   conduction detection circuitry coupled to generate a conduction signal representative of conduction times that an input signal is above a threshold value; and
   a variable reference generator coupled to receive the conduction signal and configured to generate a count value in response to a first conduction time of the conduction signal, wherein the variable reference generator is coupled to output a reference signal in response to the count value and in response to prior count values stored in the variable reference generator, the prior count values representative of prior conduction times of the conduction signal, and wherein the reference signal is for controlling a switch coupled to regulate an output of the power converter, wherein the variable reference generator includes:
   averaging circuitry coupled to generate a central tendency value in response to the count value and a quantity of the prior count values; and
   update circuitry coupled to update a reference register with the central tendency value when the count value and a second quantity of the prior count values have either all been above or all been below a count reference value stored in the reference register.

2. The controller of claim 1, wherein the update circuitry includes:
   a digital comparator coupled to generate a speed signal in response to comparing the count value and the count reference value;
   a counter coupled to be incremented or decremented in response to the speed signal;

sign check circuitry coupled to reset the counter in response to receiving a sign signal from the digital comparator that is different from a previous sign signal received from the digital comparator; and threshold circuitry coupled to output an update signal in response to the counter reaching a threshold count value, wherein the update signal allows the reference register to be updated with the central tendency value from the averaging circuitry.

3. The controller of claim 2, wherein the digital comparator varies the speed signal in response to an absolute value difference between the count value and the count reference value.

4. The controller of claim 1, wherein the variable reference generator further includes transfer circuitry coupled to output the reference signal in response to receiving the count reference value.

5. The controller of claim 1, wherein the quantity and the second quantity are the same integer.

6. The controller of claim 1, wherein the variable reference generator includes:
cascaded shift registers for storing the quantity of the prior count values, wherein a front shift register of the cascaded shift registers is coupled to receive the count value; and
an arithmetic circuitry coupled to the cascaded shift registers to generate a central tendency value (e.g. average, median, mode) of the count value and the quantity of the prior count values, wherein the reference signal is updated based on the central tendency value.

7. The controller of claim 1, wherein the input signal is a dimming signal and wherein the conduction times correspond to conduction angles of the dimming signal.

8. The controller of claim 1 further comprising an oscillator coupled to generate a system clock in response to the conduction signal, where the variable reference generator is coupled to receive the system clock, the system clock having a frequency that is much greater than the conduction signal.

9. The controller of claim 8, wherein the oscillator is configured to generate the system clock in response to a frequency of the input signal.

10. The controller of claim 8, wherein the variable reference generator includes a counter coupled to output the count value as a digital count value in response to receiving the system clock and the conduction signal.

11. The controller of claim 1, wherein the controller and the switch are included in an integrated circuit.

12. The controller of claim 1 further comprising:
a drive circuit to be coupled to control switching of the switch in response to the reference signal.

13. The controller of claim 1, wherein the variable reference generator is configured to generate the count value in response to an average of the first conduction time and a second conduction time of the conduction signal.

14. A method of operating a controller of a power converter, the method comprising:
receiving a dimming signal;
generating a conduction signal representative of conduction periods of the dimming signal;
outputting a reference signal in response to a central tendency value based on a first conduction period and prior conduction periods of the conduction periods of the dimming signal, wherein the prior conduction periods were consecutively received immediately previous to the first conduction period;
generating a count value in response to the first conduction period; and
generating the central tendency value based on the count value and prior count values generated in response to the prior conduction periods.

15. The method of claim 14, further comprising updating a count reference value with the central tendency value when the count value and a quantity of the prior count values are all above or below the count reference value.

16. The method of claim 15, wherein updating the count reference value includes:
comparing the count value with the count reference value;
generating a speed signal in response to comparing the count value with the count reference value;
incrementing or decrementing a count in response to the speed signal;
resetting the count if the count reference value is between the count value and a second count value that immediately preceded the count value; and
updating the count reference value with the central tendency value if the count reaches a threshold count value.

17. The method of claim 16, wherein the speed signal varies in response to an absolute value difference between the count value and the count reference value.

18. The method of claim 14, further comprising updating a count reference value with the central tendency value when the absolute value difference between the count value and the count reference value is greater than a specified value.

19. The method of claim 14 further comprising controlling switching of a switch in response to the reference signal, wherein the switch is coupled to regulate an output of the power converter.

20. The method of claim 14, wherein the conduction periods correspond to conduction angles of the dimming signal.

21. The method of claim 14 further comprising:
determining whether the conduction signal is a valid conduction signal; and
generating the central tendency value when the conduction signal is valid.

22. A switched mode power converter comprising:
a switch;
an energy transfer element coupled to the switch and coupled to receive a dimming signal; and
a controller coupled to the switch to regulate an output of the power converter in response to the dimmer signal, wherein the controller includes:
conduction detection circuitry coupled to generate a conduction signal representative of conduction times that the dimming signal is above a threshold voltage;
a variable reference generator coupled to receive the conduction signal and configured to generate a count value in response to a first conduction time of the conduction signal, wherein the variable reference generator is coupled to output a reference signal in response to the count value and in response to prior count values stored in the variable reference generator, the prior count values representative of prior conduction times of the conduction signal, wherein the variable reference generator includes:
averaging circuitry coupled to generate a central tendency value in response to the count value and a quantity of the prior count values; and
update circuitry coupled to update a reference register with the central tendency value when the count value and a second quantity of the prior count values have either all been above or all been below a count reference value stored in the reference register; and a drive circuit to be coupled to control switching of the switch in response to the reference signal.

23. The switched mode power converter of claim 22, wherein the update circuitry includes:

a digital comparator coupled to generate a speed signal in response to comparing the count value and the count reference value;

a counter coupled to be incremented or decremented in response to the speed signal;

sign check circuitry coupled to reset the counter in response to receiving a sign signal from the digital comparator that is different from a previous sign signal received from the digital comparator; and threshold circuitry coupled to output an update signal in response to the counter reaching a threshold count value, wherein the update signal allows the reference register to be updated with the central tendency value from the averaging circuitry.

\* \* \* \* \*